United States Patent

Pickett et al.

Patent Number: 5,664,167
Date of Patent: Sep. 2, 1997

[54] MICROPROGRAMMED TIMER PROCESSOR HAVING A VARIABLE LOOP RESOLUTION ARCHITECTURE

[75] Inventors: James Kyle Pickett, Austin, Tex.; David Wayne Stringfellow, Kokomo, Ind.

[73] Assignee: Delco Electronics Corporation, Kokomo, Ind.

[21] Appl. No.: 411,370

[22] Filed: Mar. 27, 1995

[51] Int. Cl.$^6$ ............................... G06F 1/14; G06F 9/44
[52] U.S. Cl. ................................. 395/557; 395/559
[58] Field of Search ........................ 395/550, 557, 395/559, 588, 595, 598, 965, 966

[56] References Cited

U.S. PATENT DOCUMENTS

| | | | |
|---|---|---|---|
| 4,031,521 | 6/1977 | Hall et al. | 364/DIG. 1 |
| 4,097,920 | 6/1978 | Ozga | 364/DIG. 1 |
| 4,792,892 | 12/1988 | Mary et al. | 364/DIG. 1 |
| 5,117,387 | 5/1992 | Nemirovsky et al. | 395/375 |
| 5,335,330 | 8/1994 | Inoue | 395/375 |

OTHER PUBLICATIONS

"Hitachi I–ZTAT$^{tm}$ Micorcomputer ISP Hardware Manual," Hitachi America, Ltd., Aug. 1992, pp. 1–3, 21–23, 71–78, 81–83.

*Primary Examiner*—Thomas M. Heckler
*Attorney, Agent, or Firm*—Jimmy L. Funke

[57] ABSTRACT

A programmable apparatus and method are provided for processing multiple routines so as to realize different timing resolutions. The apparatus includes a programmable timer device equipped with instruction memory for storing programmed instructions and programmable memory for storing a plurality of program counter entries, each dedicated to a corresponding routine. A plurality of program loops are provided, each of which includes a selected number of program counter entries. One entry from each of the program loops is sequentially selected and a corresponding instruction is executed. The number of entries dedicated to each program loop, or subloop, is selected so that different routines may realize different timing resolutions. Furthermore, program subloop entries could be repeated one or more times within a given loop to further improve (make finer) the timing resolution.

9 Claims, 4 Drawing Sheets

MICROPROGRAMMED TIMER PROCESSOR HAVING A VARIABLE LOOP RESOLUTION ARCHITECTURE

BACKGROUND OF THE INVENTION

1. Technical Field

This invention relates generally to instruction processing devices and, more particularly, to an apparatus and method for executing program instructions to carry out routines with different timing resolutions.

2. Discussion

It is widely known that programmed functions or routines are generally carried out by sequentially executing programmed sets of instructions. The programmed instructions are commonly stored in memory from which the instructions are fetched, read and then executed. Instructions are generally processed as a function of time to carry out the programmed routines for a given application. Generally speaking, an amount of time is required in order to process a given set of instructions. This amount of time for handling programmed instructions for each routine is commonly referred to as total execution time. The effective or average time to execute each instruction is commonly referred to as instruction resolution or timing resolution.

Different functions often require different amounts of timing resolution. For example, a timing resolution of seven microseconds may be desired in order to carry out the instructions necessary to control fuel injection in an automotive vehicle application. Other automotive-related functions such as spark timing control may require a lower (i.e., coarser) resolution of fifteen microseconds, while still other signal processing functions such as automatic transmission control functions may require a higher (i.e., finer) resolution of one or two microseconds, for example.

To perform various functions related to a given application, such as those associated with an automotive vehicle application, different timing resolutions are often required for different functions. In the past, conventional automotive timing devices have been employed to process a single function or a plurality of functions which share a common timing resolution. In order to realize different timing resolutions, conventional approaches have often required separate timing devices. With such prior approaches, each device was generally designed to process programmed functions at a predetermined timing resolution.

The conventional approaches often generally require several timing devices in order to accommodate a variety of functions which require differing levels of timing resolution. Requiring multiple timing devices results in multiple pieces of like hardware and similar software which adds to the overall cost and size of the necessary processing hardware and software. In addition, the requirement of separate individual processing devices may result in only partial utilization of available processing capability in each of the devices that are employed.

It is therefore desirable to provide for a programmable apparatus which is capable of carrying out a plurality of programmed functions, each capable of having different timing resolutions.

More particularly, it is desirable to provide for a programmable timer apparatus that can perform multiple programmed functions with differing timing resolutions for use with automotive vehicle applications so as to optimize hardware and software resources.

It is further desirable to provide a method of executing programmed functions with a single programmable apparatus to achieve different timing resolutions for different functions.

SUMMARY OF THE INVENTION

In accordance with the teachings of the present invention, an apparatus and method are provided for executing programmed instructions to perform a number of routines, each of which may realize a selected timing resolution. The apparatus includes instruction memory dedicated to storing programmed instructions and programmable memory for storing a plurality of program counter entries, each entry being dedicated to a corresponding routine. A plurality of program loops are included, each of which includes a selected number of the program counter entries. One entry from each of the program loops is sequentially selected at a rate determined by a timing signal. The number of entries dedicated to each program loop is selected so that different routines may realize different timing resolutions.

The present invention advantageously allows for the realization of different timing resolutions for different routines. According to one preferred embodiment, a single timer device may be programmed to execute programmed instructions to carry out functions with multiple timing resolutions. One or more selected number of program counter entries are dedicated to each program loop so that the resolution of a particular entry is determined by the number of entries in that loop. Loop entries could be repeated one or more times within a given loop to further improve (i.e., make finer) the timing resolution thereof.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENTS

Figure 1:
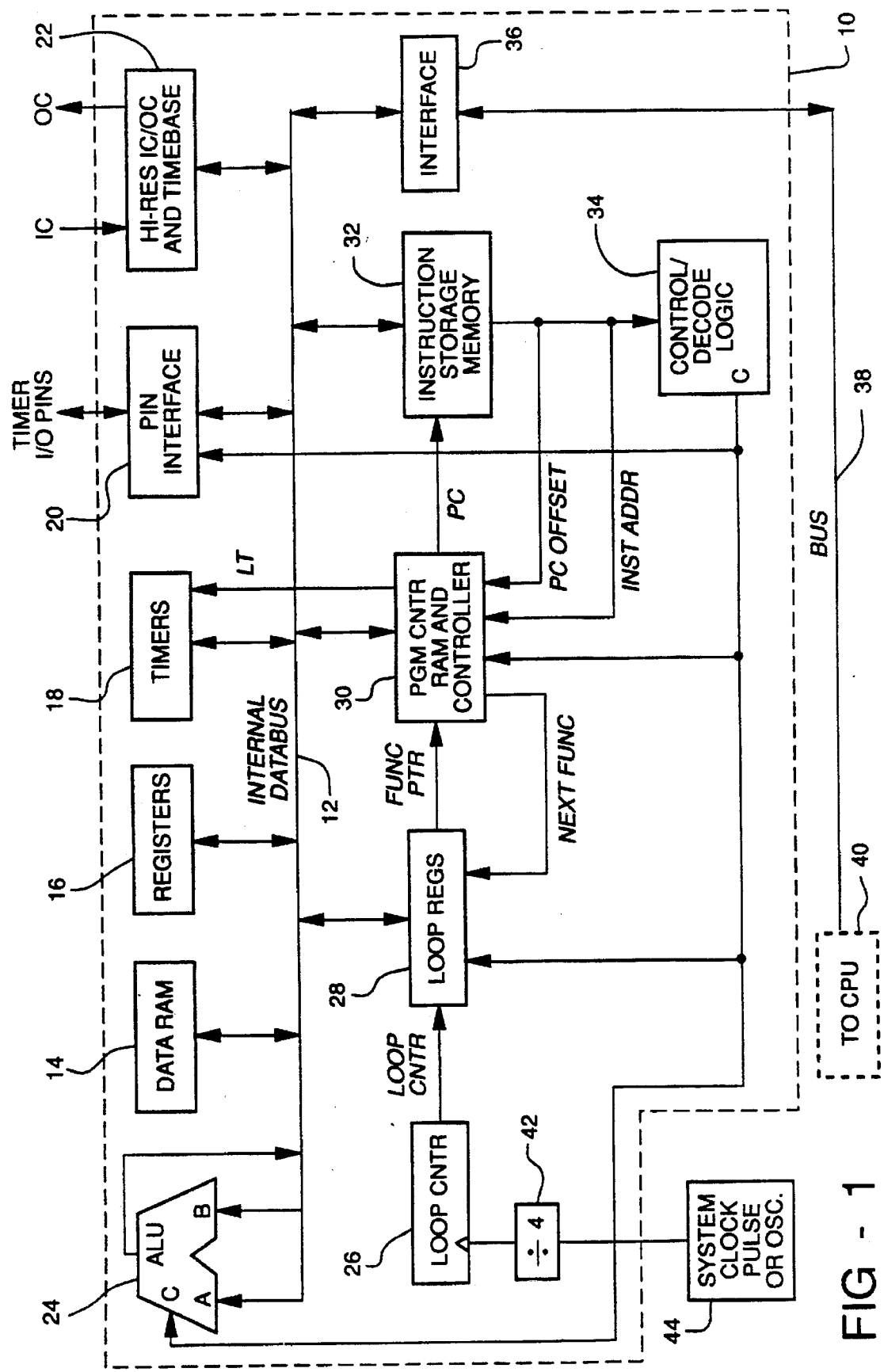
FIG. 1 is a block diagram illustrating the general architecture of flexible timer apparatus for implementing a preferred embodiment of the present invention.

Turning now to FIG. 1, the general architecture for a programmable instruction executing apparatus 10 is illustrated therein. The apparatus 10, according to one preferred embodiment, is a flexible programmable timer module that is operable to perform multiple sets of programmed instructions to carry out a number of predetermined functions or routines. More specifically, the apparatus 10 is described in connection with a flexible programmable timer module that is designed to perform instruction execution for automotive-related applications. This may include functions for performing electronic fuel injection, functions for spark timing control and automatic transmission control, and various other functions. However, it should be appreciated that the teachings of the present invention are not limited to the flexible programmable timer module and the aforementioned applications.

The programmable instruction execution apparatus 10, according to the preferred embodiment, includes an internal databus 12 for communicating data between various pieces of configured hardware. The hardware of apparatus 10 includes data random access memory (DRAM) 14 and a plurality of various registers 16 and hardware timers 18, all of which are connected to the internal databus 12 via bidirectional data communication lines. Apparatus 10 further has a pin interface 20 connected to internal data bus 12 with a plurality of timer input/output pins associated therewith. The input/output pins of pin interface 20 allow for timer interfacing. A high resolution input capture/output compare (IC/OC) and timebase 22 is also connected to the internal data bus 12 via a bidirectional communication line. Furthermore, an arithmetic logic unit (ALU) 24 is in communication with internal data bus 12 for performing various arithmetic operations.

The apparatus 10 further has a loop counter 26 with a loop counter output coupled to loop registers 28. Loop counter 26 receives an input timing signal from an off-chip system clock or oscillator 44 via a divide-by-four logic unit 42. A program counter random access memory PC RAM and associated controller 30 is included for controlling individual program flow. The program counter RAM and controller 30 is coupled to the loop register 28 and receives function pointer data from registers 28, while providing a next function pointer input back to the registers. An instruction storage memory 32 is provided which, according to the preferred embodiment, is made up of random access memory (RAM). The instruction storage memory 32 receives a program counter (PC) word from the program counter RAM and controller 30. The output of the instruction storage memory 32 is sent to control/decoder logic 34. The control/decoder logic 34 in turn supplies outputs to the program counter RAM and controller 30, loop registers 28, arithmetic logic unit 24 and interface 20. Each of loop registers 28, program counter RAM and controller 30 and instruction storage memory 32 are coupled to the internal data bus 12.

The internal data bus 12 is further connected to an interface 36. Interface 36, in turn, provides an interface between the programmable instruction execution apparatus 10 and off-chip devices. This may include a central processing unit (CPU) 40 interfaced with interface 36 via an external data bus 38. The use of an external central processing unit 40 interfaced with apparatus 10 provides central processing capability. According to one embodiment, central processing unit 40 controls the overall operation of apparatus 10.

A more detailed description of the hardware configuration of apparatus 10 will now be provided. The high-resolution (HI-RES) input capture/output compare (IC/OC) and time base 22 provides input capture functions and output compare functions and is considered separate from the main loop-based timer architecture of apparatus 10. The IC/OC and time base 22 may include an edge detect and associated logic, input capture register and a 24-bit free-running counter (not shown). The free-running counter serves as the input capture time base and supports input capture pins, each of which may be configured to detect a rising or falling edge or disable the input capture function. The edge detect logic determines the type of input event to which the function responds and may be programmable. The output compare functions are used to program a specific time when an output event should occur. Applications which need to be supported may include generating a pulse with a width that can be controlled and a resolution that can generally be finer than that of a typical instruction executed by the main part of apparatus 10 on a given output pin. The output compare function is preferably configured to automatically generate a high or low output on a pin based on a time compare coupled with a pre-programmed delay. Accordingly, IC/OC and time base 22 allows for certain timer functions which require higher (i.e., finer) resolution than may normally be provided by apparatus 10.

The pin interface 20 is responsible for controlling latching of input and output signals at the timer input/output pins. The pin interface 20 generally includes logic with data direction registers and control/decode logic. The data directory registers distinguish between input and output data, while the control/decode logic of interface 20 selects the pins needed for a particular instruction.

According to one example, there are four dedicated 24-bit hardware timers 18 and one timer is assigned for each of the main loop entries in loop registers 28. Each of timers 18 are used as operand sources for the corresponding instruction set. Instructions such as "output compare" and "compare and branch if less than" use the free-running timers 18 to generate a level on an output pin or to control program flow using a circular time comparison.

Included with registers 16 are three general types of registers, namely control/configuration registers, interrupt registers and flag registers. These registers provide enhanced communication between the central processing unit 40 and the apparatus 10. The registers 16 are preferably accessible directly from the external central processing unit 40.

The control and decode logic 34 is primarily responsible for sequencing through the program flow to select the proper microinstructions and decode the microinstructions to generate control signals or microorders. Each of the microinstructions is preferably encoded into a 20-bit format to simplify decoding thereof. The control and decode logic 34 is preferably made up of a pipelined microinstruction register and an instruction decoder (not shown). During a fetch/decode phase of a given instruction, the control and decode logic 34 selects operands for input to the arithmetic logic unit 24 and selects which arithmetic logic unit operation is performed on the given operands. During the execute phase of the instruction, the control and decode logic 34 controls how the arithmetic logic unit 24 output is written to a destination address and manipulates program flow via the program counter and RAM controller 30.

The data RAM 14 preferably has a plurality of 24-bit timer parameters which include a group of logical registers, four per function/pin which are utilized by microinstructions, and a group of global-only parameters. Generally speaking, the microinstructions read parameters from the data RAM 14 and operate on the parameters in the arithematic logic unit 14. After the read and operate steps, the parameters are then, on conditions, written back to the data RAM 14.

The loop counter 26 of apparatus 10 is preferably a two-bit synchronous counter which sequences through the four function pointers that are stored in the loop registers 28. According to one example, the loop counter 26 selects one of the four loop registers 28, one at a time, in a sequential order. Accordingly, loop counter 26 runs consecutively from zero to three and then loops back to zero.

Figure 2:
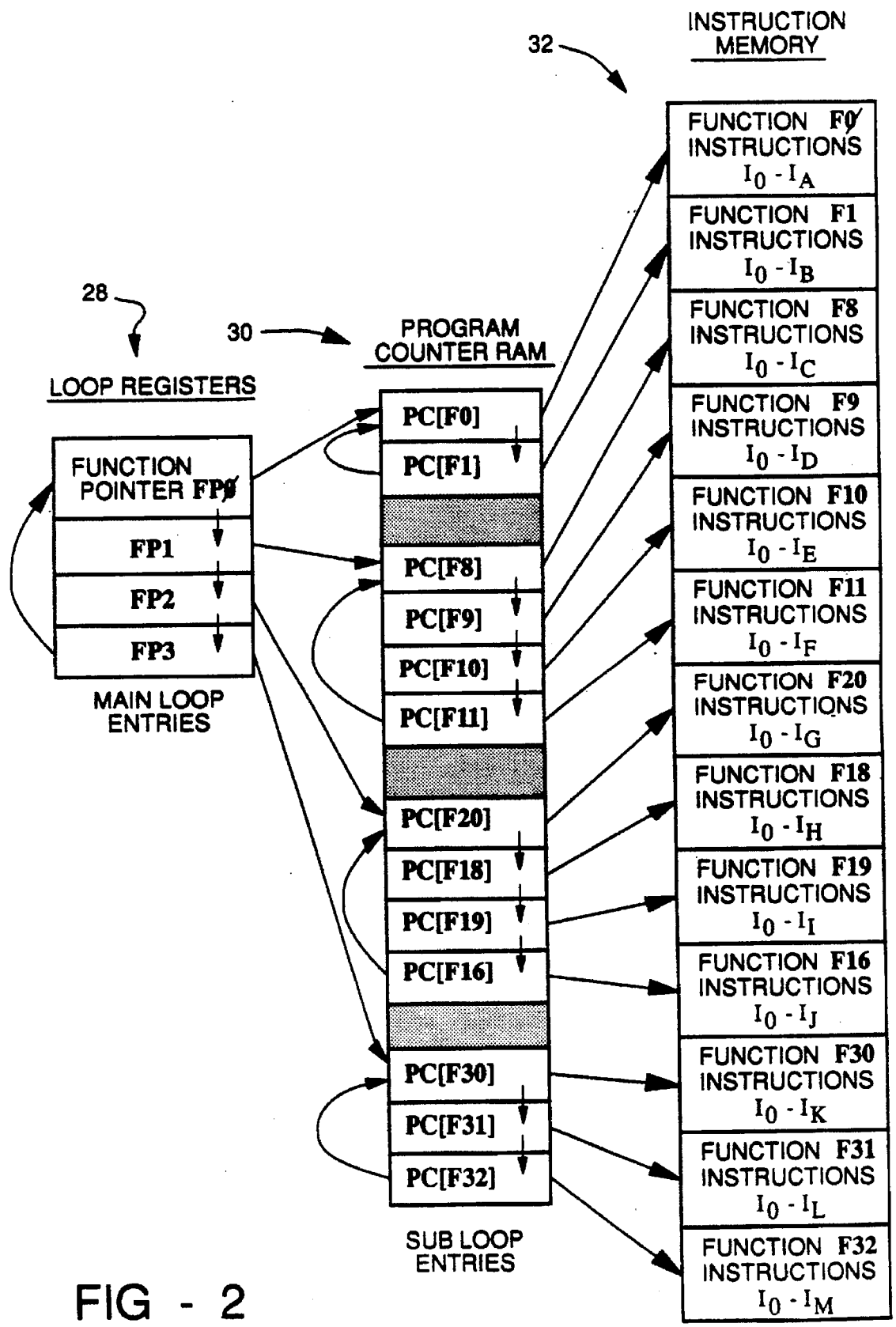
FIG. 2 is a schematic diagram illustrating execution of programmed instructions to achieve multiple timing resolutions according to one embodiment of the present invention.

The loop registers 28 are shown in more detail in FIG. 2 and include four registers, according to the example shown. The four loop registers 28 hold corresponding function pointers FP0 through FP3. Function pointers FP0 through FP3 control the sequencing of the apparatus 10 through each of a plurality of program loop entries, also referred to herein as subloop entries, which are stored in the program counter RAM 30. In one embodiment, each of loop registers 28 has six-bits of memory space and can be reset, loaded in parallel during normal operation, or written to by the external central processing unit 40. As a given instruction undergoes execution, the corresponding loop register 28 is overwritten with the next function pointer as provided in response to the program counter RAM and controller 30 and the control/decode logic 34.

The program counter RAM 30 and associated controller includes, according to one embodiment, sixty-four 16-bit memory locations for storing up to sixty-four 16-bit data entries which provide program flow control parameters. Each parameter of the program counter RAM 30 is generally split into the following three fields: increment loop timer (LT), next function pointer (NFP), and program counter (PC). The 16-bit data entries are stored in memory as shown in Table 1 below:

TABLE 1

| PC RAM | | | | Entry |
|---|---|---|---|---|
| bit: 15 | 14 | 9 8 | 0 | |
| LT | NFP | PC | | 0 |
| LT | NFP | PC | | 1 |
| . | . | . | . | |
| . | . | . | . | |
| . | . | . | . | |
| LT | NFP | PC | | 62 |
| LT | NFP | PC | | 63 |

The increment loop timer (LT) contains a single big which, when set to logic "1", increments the hardware timer 18 that corresponds to the present main loop entry. The corresponding timer 18 is incremented by one when the sequencing logic steps to the next main loop entry. The next function pointer (NFP) and program counter field (PC) control the flow of each program or routine in the flexible timer apparatus 10. The next function pointer (NFP) contains six bits (bits 9-14) of data and controls the subloop sequencing. The next function pointer specifies the function containing the instruction to be executed the next time the subloop entry is executed. The program counter field (PC) as shown in Table 1 includes nine bits (bits 0-8) of data and controls instruction sequencing for each routine contained in the instruction memory 32. The program counter field is initialized to point to the first instruction of the corresponding function and is then subsequently modified by the program counter RAM control logic contained in PC RAM and associated controller 30. The instruction flow can be sequential or can follow a oneway-branch (conditional or unconditional).

With particular reference to FIG. 2, the loop register 28, program counter RAM 30 and instruction memory 32 are shown in detail and configured according to one embodiment of the present invention. Each of the four loop registers FP0 through FP3 contains a six-bit function pointer which controls the sequencing through the subloop entries contained in the program counter RAM 30. As an instruction is executed, the corresponding loop register is overwritten with the next function pointer field contained in the program counter RAM 30.

The program counter RAM 30 contains sixty-four 16-bit program flow control parameters which are grouped into four control loops. Each of the control loops includes a selected number of program counter loop entries. The control loop corresponding to function pointer FP0 includes a first program counter subloop entry PC[F0] and a second program counter subloop entry PC[F1]. The second control loop corresponds to function pointer FP2 and includes four subloop entries PC[F8], PC[F9], PC[F10] and PC[F11]. The third control loop corresponds to function pointer FP2 and likewise has four program counter subloop entries PC[20], PC[F18], PC[F19] and PC[16]. The fourth and last control loop corresponds to function pointer FP3 and includes three subloop entries PC[F30], PC[F31] and PC[F32]. The program counter subloop entries are time multiplexed and follow a consecutive looping pattern whereby the first control loop follows a looping path from PC[F0] to PC[F1], while the second control loop follows a looping path from PC[F8] to PC[F9] to PC[F10] to PC[F11] and back to PC[F8]. The last two subloops sequence in a similar fashion.

The instruction memory 32 contains the programmed instructions for carrying out desired functions and routines. Each program counter subloop entry from program counter RAM 30 points to a memory location containing an instruction from the corresponding function. For example, subloop entry PC[F0] points to instructions $I_0$ through $I_A$ for executing function F0. Likewise, each program counter subloop entry points to a respective programmed series of instructions corresponding to the function to be carried out therewith In accordance with the present invention, the subloop entries stored in program counter RAM 30 are selected for each routine so as to achieve a desired timing resolution for the corresponding instructions. That is, given a fixed number of possible subloop entries, such as sixty-four storage locations, for a limited program counter RAM 30, the subloop entries are selected so that different routines may achieve timing resolutions which may be different from timing resolutions for other routines. For example, the first subloop in program counter RAM 30 corresponding to function pointer FPO contains two entries, while the second and third subloops corresponding to function pointers FP1 and FP2 each contain four entries, and the last subloop corresponding to function pointer FP3 has three subloop entries. According to this embodiment, the number of entries within each subloop is determinative of the timing resolution associated with the corresponding subloops. The first subloop corresponding to function pointer FP0 will have a timing resolution which is twice the speed of the second subloop corresponding to function pointer FP1. This is because subloop entries PC[F0] and PC[F1] execute the corresponding instructions twice for every single execution of the instructions corresponding to program counters PC[F8] through PC[F11]. Accordingly, the user is able to configure the program counter RAM 30 so that each subloop contains a desired number of entries which provide the desired timing resolution.

The apparatus 10 is configured as a software looping structure. It should be understood that the main loop entries in loop registers 28 and the instruction execution time, measured in clock cycles, are determinative of the timing with which each main loop in register 28 is executed. Given four entries in registers 28 and a four clock cycle instruction execution time, each entry in loop register 28 is executed every sixteen clock cycles. Given an oscillating clock signal of 16.7 megahertz, this correlates to an execution time of approximately 0.95 microseconds. Since each entry in register 28 operates as a pointer to subloop entries in program counter RAM 30, the number of entries within a given loop corresponding to a particular function pointer multiplied by the execution time will determine the overall timing resolution. For example, the first subloop of program counter RAM 30 corresponding to function pointer FP0 has two entries and therefore has a timing resolution of two multiplied by 0.95 microseconds, which equals 1.90 microseconds. The second subloop corresponding to function pointer FP1 which has four subloop entries has a timing resolution of four multiplied by 0.95 microseconds, which is equal to 3.80 microseconds. Accordingly, instructions addressed by the first subloop will be executed at twice the speed of the instructions executed by the second subloop.

Figure 3:
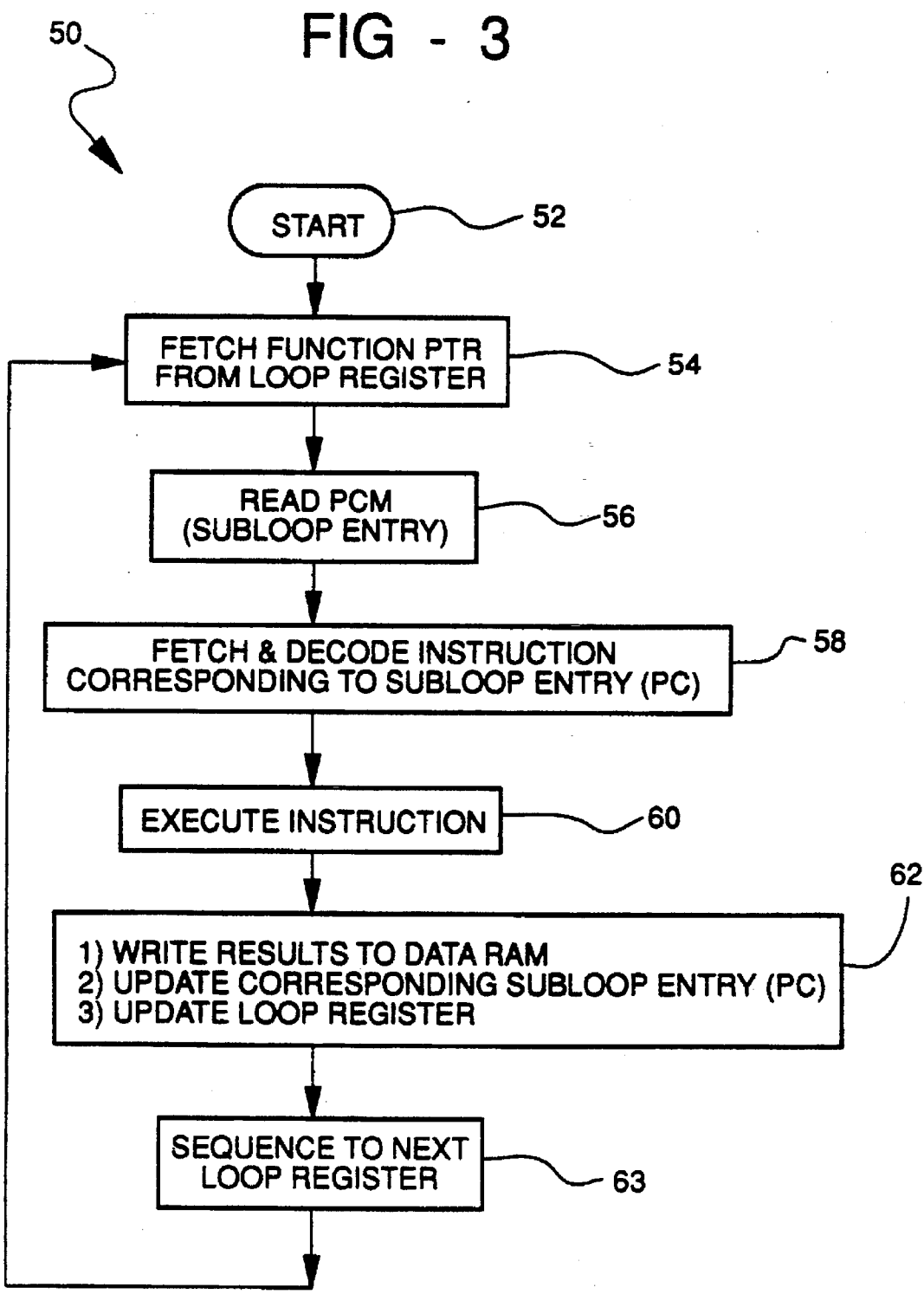
FIG. 3 is a flow diagram illustrating the program methodology of fetching and executing program instructions according to the present invention.

The method 50 for executing instructions with apparatus 10 according to the present invention is illustrated in FIG. 3. The methodology 50 begins at start block 52. The methodology 50, according to the first step 52, fetches a function pointer such as FP0 from loop register 28. The function pointer FP0 points to program counter RAM 30, and more particularly to subloop entry PC[F0]. The program counter subloop entry PC[F0] will point to the address of one of the instructions selected from $I_0$ through $I_A$ according to step 58. Additionally, a single instruction from the routine consisting of instructions $I_0$ through $I_A$ (corresponding to subloop entry PC[F0]) is decoded. Next, the fetched instruction is executed pursuant to step 60. For example, two operands fetched from data RAM 14 could be added using the "ADD" instruction mnemonic. The executed instruction result is then written to data RAM 14 as provided in step 62. Furthermore, the corresponding subloop entry is updated to point to the next program counter subloop entry within the same control loop. For example, given the previous subloop entry of PC[F0], the corresponding subloop entry will be updated to PC[F1] by writing the next function pointer field (NFP) of the PC RAM to the current loop register. Additionally, the loop register With function pointer FP0 will switch to FP1. Lastly, the loop counter is incremented to point to the next loop register in the sequence FP0 . . . FP3 as provided in step 63. From step 63, the methodology will return to step 54.

The functions specified in the program counter RAM 30 are time multiplexed, while the instructions executed in instruction memory 32 are deterministic. Since the program counter RAM 30 is time multiplexed, subloop entries are selected sequentially during each execution time by the function pointers FP0 through FP3 in loop registers 28. Accordingly, function pointer FP0 selects one entry from the first loop and then, after steps 54 through 63 are completed, proceeds to function pointer FP1 which in turn selects one entry from the second subloop, and so on. Referring back to FIG. 2, the timing sequence is illustrated in Table 2 below:

TABLE 2

| Instruction Cycle | Loop Register | Program Counter | Instruction Executed |
|---|---|---|---|
| init. - 0 | FP0 | PC[F0] | $F0/I_0 - I_A$ |
| 1 | FP1 | PC[F8] | $F8/I_0 - I_C$ |
| 2 | FP2 | PC[F20] | $F20/I_0 - I_G$ |
| 3 | FP3 | PC[F30] | $F30/I_0 - I_K$ |
| 4 | FP0 | PC[F1] | $F1/I_0 - I_B$ |
| 5 | FP1 | PC[F9] | $F9/I_0 - I_D$ |
| 6 | FP2 | PC[F18] | $F18/I_0 - I_H$ |
| 7 | FP3 | PC[F31] | $F3/I_0 - I_L$ |
| 8 | FP0 | PC[F0] | $F0/I_0 - I_A$ |
| 9 | FP1 | PC[F10] | $F10/I_0 - I_E$ |
| 10 | FP2 | PC[F19] | $F19/I_0 - I_I$ |
| 11 | FP3 | PC[F32] | $F32/I_0 - I_M$ |
| 12 | FP0 | PC[F1] | $F1/I_0 - I_B$ |
| 13 | FP1 | PC[F11] | $F11/I_0 - I_F$ |
| 14 | FP2 | PC[F16] | $F16/I_0 - I_J$ |
| 15 | FP3 | PC[F30] | $F30/I_0 - I_K$ |

As shown in Table 2 above, the instruction sequence begins at loop register FP0 pointing to program counter PC[F0] which in turn addresses an instruction $I_0$ function from F0. As the function pointers are sequenced repeatedly from FP0 through FP3 and back to FP0, the next in-line entry within each subloop is selected. With the second sweep through function pointers FP0 through FP3, subloop entries PC[F1], PC[F9], PC[F18] and PC[F31] are sequentially selected. The third sweep through function pointers FP0 through FP3 will sequentially point to PC[F0], PC[F10], PC[F19] and PC[F32]. Accordingly, the first subloop corresponding to function pointer FP0 addresses an instruction from the routine consisting of instructions $I_0$ through $I_A$ for function F0 for a second time, while the second loop corresponding to function pointer FP2 addresses instruction from the routine consisting of instructions $I_0$ through $I_E$ for function F10 for the first time. The fourth sweep of function pointers FP0 through FP3 will point to subloop entries PC[F1], PC[F11], PC[F16] and PC[F30]. The fifth sweep of function pointers FP0 through FP3 will point to subloop entries PC[F0], PC[F8], PC[F20] and PC[F31].

Figure 4:
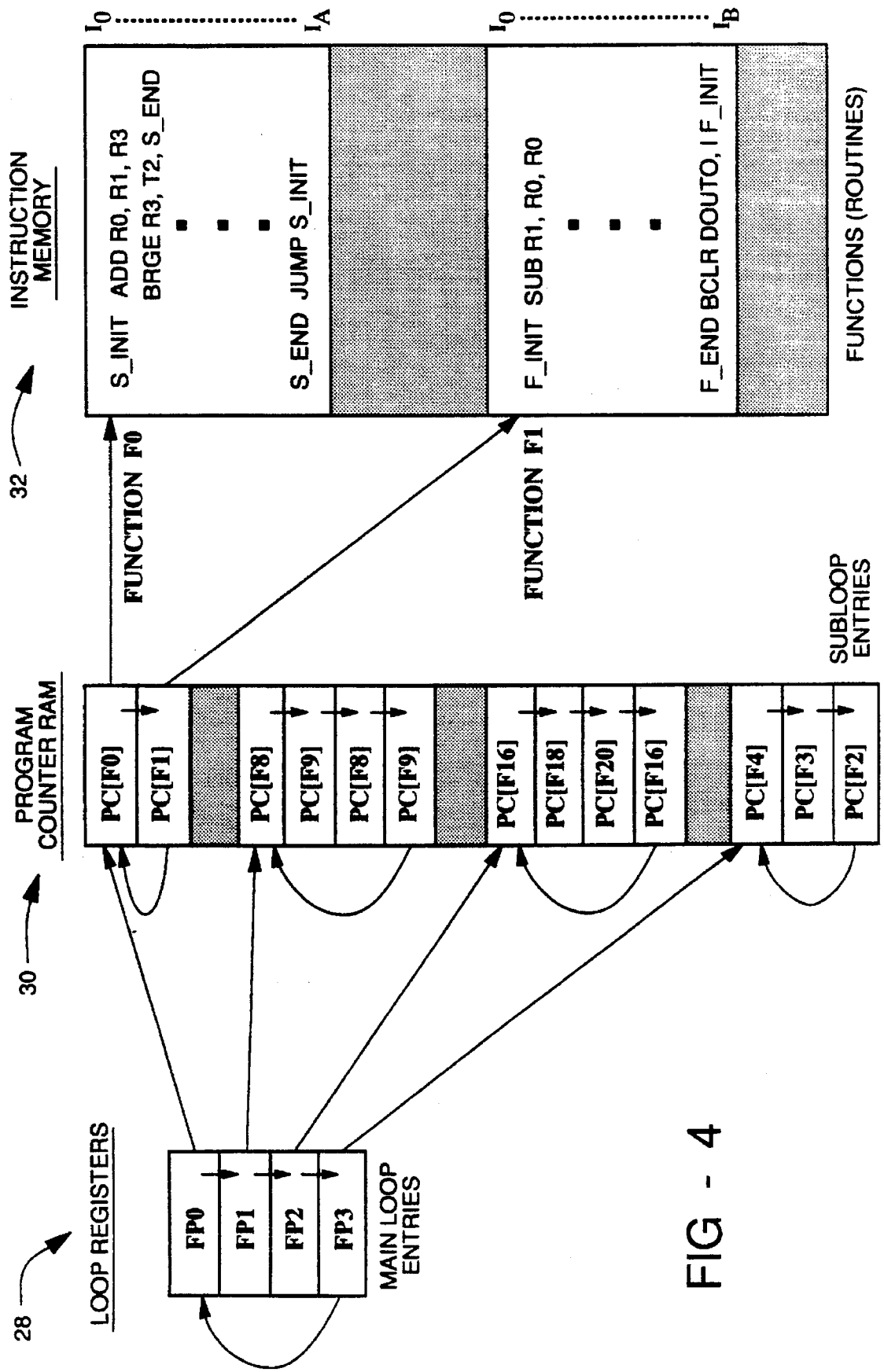
FIG. 4 is a schematic diagram illustrating execution of programmed instructions according to a second embodiment of the present invention.

According to a further embodiment of the present invention, entries can be repeated one or more times within the same subloop as illustrated in FIG. 4. Referring to the second subloop in FIG. 4 which corresponds to function pointer FP1, subloop entries PC[F8] and PC[F9] are programmed twice within the same subloop so that a four entry subloop may provide the same timing resolution as a two entry subloop such as the first subloop corresponding to function pointer FP0. The third loop corresponding to function pointer FP2 provides for a repeated subloop entry PC[F16], while entries PC[F18] and PC[F20] are programmed to occur once within the same subloop. Accordingly, the routine corresponding to subloop entries PC[F16] will occur at twice the timing resolution of the other two entries PC[F18] and PC[F20] within the same subloop. It should further be appreciated that the subloop entries may be programmed easily within the program counter RAM 30 and need not follow a sequential ordering as shown by the fourth loop corresponding to function pointer FP3.

While this invention has been disclosed in connection with a particular example thereof, no limitation is intended thereby except as defined in the following claims. This is because a skilled practitioner recognizes that other modifications can be made without departing from the spirit of this invention after studying the specification and drawings.

The embodiments of the invention in which an exclusive property or privilege is claimed are defined as follows:

1. An apparatus operable for executing program instructions to perform a plurality of routines with different timing resolutions, said apparatus comprising:

means for providing a timing signal;

instruction memory for storing programmed instructions;

a processor for executing the programmed instructions, each of the instructions being executable in an instruction execution time as a function of the timing signal;

programmable memory for storing a plurality of program counter entries, each of said program counter entries being dedicated to a corresponding routine;

a plurality of program loops defining groupings of routines, each of said program loops including a selected number of said program counter entries;

time multiplexing means including function pointers for sequentially selecting one entry from each of the program loops as a function of the timing signal, each of said function pointers selecting program counter entries from the plurality of program loops; and programming means for selecting the number of entries dedicated to each program loop so that different routines may have different timing resolutions.

2. The apparatus as defined in claim 1 wherein said apparatus is a programmable timer device.

3. The apparatus as defined in claim 1 further comprising a plurality of loop registers containing the function pointers for accessing selected portions of the programmable memory which store the program counter entries.

4. The apparatus as defined in claim 1 wherein one of said program counter entries is repeated within a program loop to improve timing resolution.

5. A programmable timer apparatus with a variable loop architecture and operable for executing program instructions to perform a plurality of routines with different timing resolutions, said timer apparatus comprising:

means for providing a timing signal;

instruction memory for storing programmed instructions;

programmable memory having a fixed number of memory locations for storing a plurality of program counter entries, each of said program counter entries being dedicated to a corresponding routine;

a plurality of loop registers for accessing selected memory locations containing the program counter entries;

time multiplexing means including function pointers for sequentially selecting one entry from each of the loop registers as a function of the timing signal; and programming means for selecting the number of entries dedicated to each of the loop registers so that different routines may have different timing resolutions.

6. The apparatus as defined in claim 5 wherein one of said program counter entries is repeated within a program loop to improve timing resolution.

7. A method for executing program instructions so as to perform a plurality of routines with different timing resolutions, said method comprising the steps of:

receiving a timing signal;

providing programmed instructions in memory;

storing a plurality of program counter entries in a programmable memory, each of said program counter entries being dedicated to a corresponding routine;

grouping said program counter entries into a plurality of program loops, each loop including a selected number of said program counter entries;

sequentially selecting one entry from each of the program loops as a function of the timing signal;

programming the number of entries dedicated to each program loop so that different routines may have different timing resolutions; and executing the programmed instructions as a function of the timing signal.

8. The method as defined in claim 7 further comprising the step of repeating one of said program counter entries within a program loop so as to improve timing resolution.

9. The method as defined in claim 7 wherein the step of sequentially selecting one entry comprises accessing selected portions of the programmable memory with a plurality of loop registers.

* * * * *